United States Patent [19]

Shirato et al.

[11] 3,717,522

[45] Feb. 20, 1973

[54] METHOD FOR FORMING A CROSS-LINKED POLYETHYLENE INSULATOR

[75] Inventors: Akira Shirato, Kohoku-ku, Yokohama; Hidezo Furuyama, Totsuka-ku, Yokohama; Masaru Aoki, Kawasaki-shi, all of Japan

[73] Assignee: Showa Electric Wire and Cable Co., Ltd., Kawasaki-shi, Japan

[22] Filed: July 25, 1969

[21] Appl. No.: 845,036

[30] Foreign Application Priority Data

July 29, 1968 Japan..................................43/53463
Nov. 4, 1968 Japan..................................43/80495

[52] U.S. Cl. .......................156/53, 156/85, 156/87, 174/110
[51] Int. Cl. ............................................H01b 13/06
[58] Field of Search................156/51, 52, 53, 85, 87; 174/110

[56] References Cited

UNITED STATES PATENTS

| | | |
|---|---|---|
| 3,429,983 | 2/1969 | Hofmeier..........................156/53 X |
| 2,524,536 | 10/1950 | Nordlander et al..................156/51 X |
| 3,033,727 | 5/1962 | Cram et al..........................156/53 X |
| 3,054,710 | 9/1962 | Nixon..................................156/53 X |
| 3,274,037 | 9/1966 | Nixon................................156/187 X |
| 3,455,752 | 7/1969 | Gray et al...............................156/51 |

FOREIGN PATENTS OR APPLICATIONS 1,025,672 4/1966 Great Britain..........................156/51

Primary Examiner—Carl D. Quarforth
Assistant Examiner—E. E. Lehmann
Attorney—Craig, Antonelli and Hill

[57] ABSTRACT

A cross-linked polyethylene insulation having good electrical characteristics can be obtained by laminatedly wrapping of solid phase polyethylene film containing a small amount of substantially involatile hydrocarbon insulating oil and di-α-cumyl peroxide round a solid article and then heating the wrapped article. The present method is suitable as a method for forming a thick cross-linked polyethylene insulation on large size conductor or forming a joint section of cross-linked polyethylene cable.

7 Claims, No Drawings

METHOD FOR FORMING A CROSS-LINKED POLYETHYLENE INSULATOR

BACKGROUND OF THE INVENTION

This invention relates to an improved method for forming a cross-linked polyethylene insulation such as a cable insulation for the cross-linked polyethylene cable or a joint section of the cross-linked polyethylene cable.

As a method for forming a cable insulator for the cross-linked polyethylene cable, there has been heretofore proposed a method comprising extruding solid-phase polyethylene pellets containing a small amount of di-α-cumyl peroxide onto a conductor at a temperature of not more than 140°C to coat the conductor with the extruded polyethylene and heating the thus coated conductor at a temperature of 140° to 180°C until at least about 70 percent of the polyethylene becomes insoluble in xylene at 80°C.

However, according to the conventional method, the solid phase polyethylene frequently undergoes scorching (initial stage cross-linking) in an extruder cylinder, and further a large extruder and a large auxiliary facility are required to produce an insulation of large size. Thus, the conventional method has such drawbacks.

Further, there has been so far known a process comprising irradiating a solid phase polyethylene film with electronic beams to cross-link a part of molecules, stretching the irradiated film, laminatedly wrapping the thus stretched film and a non-cross-linked solid phase polyethylene film round a solid article, the former film being disposed upon the latter film, and then heating the wrapped article to integrally weld these films, but the thus obtained insulation has such drawbacks that the degree of cross-linking is low; very fine voids tend to remain between the wrapped layers; and consequently the long-term breakdown voltage and corona starting voltage are low.

Furthermore, there has been heretofore known a method comprising laminatedly wrapping a solid phase polyethylene film containing a small amount of di-α-cumyl peroxide, integrally welding layers at a temperature of 110° to 180°C and simultaneously cross-linking the same, but the thus obtained insulator also has such drawbacks as very fine voids remain between layers and consequently its electrical reliability is low.

In these conventional methods, the cross-linking is effected by heating the solid phase polyethylene to a temperature above the melting point of the solid phase polyethylene, and consequently there has been such a drawback that a deformation tends to take place.

SUMMARY OF THE INVENTION

One object of the present invention is to provide a cross-linked polyethylene insulation having a high long-term breakdown voltage and corona starting voltage wherein very fine voids between layers are filled with a hydrocarbon insulating oil.

Other object of the present invention is to provide a cross-linked polyethylene insulation of large size by a simple means.

Another object of the present invention it to provide a cross-linked polyethylene insulation having a small deformation under cross-linking process.

According to the present invention, a cross-linked polyethylene insulation can be obtained by laminatedly wrapping a film containing a small amount of di-α-cumyl peroxide and a small amount of hydrocarbon insulating oil round a solid article then heating the wrapped article thereby to integrally weld interlayers and simultaneously cross-linking polyethylene molecules.

The thus obtained cross-linked polyethylene insulation has considerably improved long-term breakdown voltage and corona starting voltage, because the very fine voids remaining inside are filled with the hydrocarbon insulating oil. According to the present invention, an insulator can be obtained only by wrapping a film and heating the wrapped film, and consequently, a cross-linked polyethylene insulation of large size can be obtained by a simple means.

In other embodiment of the present invention, a small amount of a peroxide for cross-linking, which has a lower decomposition temperature than 110°C, is added to the film containing di-α-cumyl peroxide and the hydrocarbon insulating oil, and the film is heated at a lower temperature than 110°C in advance before being wrapped round the solid article, thereby to effect a low degree cross-linking. According to such embodiment of the present invention, the flowability of wrapped film layers at heating can be controlled, and a cross-linked polyethylene insulation having a small deformation can be obtained.

DETAILED DESCRIPTION OF THE INVENTION

According to the present invention, a cross-linked polyethylene insulation can be obtained by laminatedly wrapping a solid phase polyethylene film containing 0.5 to 5.0 percent by weight of substantially involatile hydrocarbon insulating oil and 0.5 to 5.0 percent by weight of di-α-cumyl peroxide, at least 60 percent of polyethylene being soluble in xylene at 80°C, round a solid article, and heating the wrapped article at a temperature of 110° to 180°C until at least 70 percent of polyethylene becomes insoluble in xylene at 80°C.

The substantially involatile hydrocarbon insulating oil used in the present invention is a conventionally employed cable insulating oil or process oil for rubber, and includes various hydrocarbon insulating oil and synthetic insulating oil.

The film used in the present invention is a film having a thickness of 0.05 to 0.5 mm prepared by an inflation method or T-die method. If the thickness of the film is less than 0.05 mm, a sufficient tension cannot be applied to the film when wrapped, and if the thickness of the film is more than 0.5 mm, the gaps at wrapping become large and tend to be retained even after the heat welding. Thus, the films having a thickness of less than 0.05 mm or more than 0.5 mm are not preferable.

As the film constituent material, solid phase polyethylene, high density, intermediate density and low density polyethylenes as well as such copolymers as ethylene-vinyl acetate copolymer and ethylene-ethyl acrylate copolymer can be used.

Among these solid phase polyethylenes, the non-cross-linked one which is completely soluble in xylene at 80°C can be used, but the solid phase polyethylene, which is made 3 to 40 percent insoluble in xylene at 80°C by irradiating a film with electronic beams after the film has been formed, or immersing a film into a peroxide for cross-linking having a lower decomposition point than 110°C after the film has been formed, to make a small amount of said peroxide for cross-linking permeate into the film and heating the film at a temperature lower than 110°C until 3 to 40 percent of the polyethylene becomes insoluble in xylene at 80°C, can be also used. The decomposition point is an indicator showing a characteristic of a peroxide for cross-linking, and signifies a temperature at which the peroxide is decomposed to a half for ten hours. When the partially cross-linked film is used, the flowability of film interlayers at heating can be controlled, and the deformation at the cross-linking can be prevented.

The present film can be obtained by kneading solid phase polyethylene which is completely soluble in xylene at 80°C and a predetermined amount of di-α-cumyl peroxide at a temperature below a decomposition point of di-α-cumyl peroxide, forming a film, and immersing the thus formed film in a substantially involatile hydrocarbon insulating oil to make the oil permeate into the film, but also can be obtained by immersing a film of polyethylene, more than 60 percent of which is soluble in xylene at 80°C into a solution of substantially involatile hydrocarbon insulating oil containing dissolved di-α-cumyl peroxide to make both the insulating oil and di-α-cumyl peroxide simultaneously into the film. However, in the latter case, it is necessary to dissolve at least 10 percent by weight of di-α-cumyl peroxide in the substantially involatile hydrocarbon insulating oil.

The permeability of the hydrocarbon insulating oil used in the present invention is given in Table 1. In the Table, the permeation time is a period of time required for complete permeation determined by laying 4 parts by weight of a solution of insulating oil containing the same amount of dissolved di-α-cumyl peroxide as the amount of insulating oil on 100 parts by weight of polyethylene pellets having a melt index of 1.5 (Mirason No. 9 : a trade mark of Mitsui Polychemical K.K. Japan) and leaving the laid solution to complete permeation into the pellets. Indication "small" as regards the solubility of di-α-cumyl peroxide in the Table means that di-α-cumyl peroxide starts to deposit when the solution is left standing at the ambient temperature for a prolonged period of time.

TABLE 1

| Insulating oil | Manufacturer | S¹ | P² |
|---|---|---|---|
| Medium process oil for rubber | Mitsubishi Sekiyu K.K. | small | 450 |
| Process oil for rubber | Nipon Sekiyu K.K. | large | 300 |
| Synthetic insulating oil for OF Cable | Nippon Sekiyu K.K. | large | 300 |
| Insulating oil for OF Cable | Showa Sekiyu K.K. | large | 200 |
| Heavy insulating oil | Nippon Kogyo K.K. | small | 450 |
| Insulating oil for SL Cable | | small | 1500 |

¹ Solubility of di-α-cumyl peroxide
² Permeation time, 75°C, (min)

When said peroxide for cross-linking having a decomposition point lower than 110°C is used, the solid phase polyethylene film can be obtained by adding the peroxide to a solution of hydrocarbon insulating oil containing the di-α-cumyl peroxide and allowing about 0.5 to 5.0 percent by weight of the peroxide to permeate into the film together with di-α-cumyl peroxide and hydrocarbon insulating oil, and heating the film at a temperature below 110°C until 3 to 40 percent by weight of the polyethylene becomes insoluble in xylene at 80°C.

In that case, it is necessary that at least 10 percent each of a peroxide for cross-linking having a decomposition point below 110°C, di-α-cumyl peroxide and hydrocarbon insulating oil are present in the solution.

The peroxide for cross-linking having a decomposition point below 110°C includes propionyl peroxide, isobutyryl peroxide, octanoyl peroxide, decanoyl peroxide, 3,5,5-trimethylhexanoyl peroxide, 2,4-dichlorobenzoyl peroxide, tert-butyl peroxyacetate, tert-butyl peroxypivalate, tert-butyl peroxy-2-ethylhexanoate, tert-butyl peroxylaurate, tert-butyl peroxyisobutyrate, and 1,1-bis (tert-butyl peroxy)-3,3,5-trimethylcyclohexane.

Among these peroxides for cross-linking, particularly tert-butyl peroxyethylhexanoate and tert-butyl peroxyisobutyrate has such a characteristic that a relatively high degree of cross-linking can be obtained by a small permeated amount. Further, 1,1-bis (tert-butyl peroxy)-3,3,5-trimethylcyclohexane can yield a comparatively high degree of cross-linking around the melting point of polyethylene, and thus even if a film having a low degree of cross-linking is used, no flowing takes place at all. Thus, these peroxides are particularly suitable for the present invention.

In the present invention, an antioxidant such as trimethylene hydroquinoline polymer (Agerite resin D : a trademark of R.T. Vanderbilt Co. U.S.A.) or Antage Crystal (a trademark of Kawaguchi Kagaku K.K. Japan) and voltage stabilizer can be additionally used in the film, if required.

These additives can be added to the solid phase polyethylene before the di-α-cumyl peroxide or substantially involatile hydrocarbon insulating oil is added to the film, but a predetermined amount of the additives may be dissolved in substantially involatile hydrocarbon insulating oil together with di-α-cumyl peroxide and be allowed to permeate into the film.

According to the present invention, the thus obtained solid phase polyethylene film, more than 60 percent of which is soluble in xylene at 80°C. (which will be hereinafter referred to as "CL-P film") having a thickness of 0.05 to 0.5 mm and containing 0.5 to 5.0 percent by weight of substantially involatile hydrocarbon insulating oil and 0.5 to 5.0 percent by weight of di-α-cumyl peroxide is wrapped around a solid article layer on layer under a constant tension. In that case, if the tension of CL-P film is less than 0.2 kg/mm², the film is wrapped insufficiently and voids are retained inside. On the contrary, if the tension is more than 1.2 kg/mm², the film is excessively stretched. Thus, it is necessary that the tension be in a range of 0.2 to 1.2 kg/mm².

Then, a tetrafluoroethylene tape and successively a polyester tape are wrapped round the wrapped laminate layers of CL-P film, and further a band heater is wrapped round the polyester tape later to heat the layers at 110° to 180°C. The wrapped layers are integrally welded to one another at that temperature and heating is continued until at least 70 percent of the polyethylene film becomes insoluble in xylene at 80°C. In the case that the solid article, round which CL-P film is wrapped layer on layer, is a cable conductor, heating can be effected from the inside by passing the current through said cable conductor. Further, in the case that the slightly cross-linked CL-P film, which is 3 to 40 percent insoluble in xylene at 80°C, is used, there is no problem when heated, but in the case that CL-P film, which is completely soluble in xylene at 80°C, is used, some deformation takes place at heating. To prevent such deformation, it is better to wrap a layer of slightly cross-linked film at every three or four layers of CL-P film. In the thus obtained cross-linked polyethylene insulator, gaps between layers are completely squeezed by the tension applied to CL-P film, and the air in the gaps is made to permeate through the CL-P film which is made permeable by heating and is squeezed to the outside. Thus, no voids are retained at all between the layers. Further, very fine voids are filled with the hydrocarbon insulating oil contained in the film, and thus the insulator having a high long-term breakdown voltage and corona starting voltage can be obtained.

According to the present invention, no extruder is used, and thus a cross-linked polyethylene insulation of large size can be readily prepared. Thus, the present invention is suitable for formation of a cable insulation for high voltage cross-linked polyethylene cable or formation of a joint part for high voltage cross-linked polyethylene cable.

The adjustment of the degree of cross-linking of CL-P film is readily carried out by experimentally determining an amount of a peroxide for cross-linking within a range of 0.5 to 5 percent by weight depending upon the kind of a peroxide used for the cross-linking, and suitably setting a treating temperature and a treating time according to the determined amount of the peroxide. For example, a relation between the impregnated amount of tert-butyl peroxy-2-ethylhexanoate and the gel fraction (which will be defined later) is given below.

| Impregnated amount (%) | Gel fraction (%) |
|---|---|
| 1 | 12 |
| 2 | 22 |
| 3 | 26 |
| 4 | 28 |

(heating conditions: 90°C, 5 hours)

The present invention will be explained with reference to Examples:

Example A

| synthetic insulating oil for OF cable (made by Nippon Oil K.K.) | 2 parts by weight |
| Di-α-cumyl peroxide | 2 parts by weight |
| antioxidant (Antage Crystal) | 0.15 part by weight |

A film having a thickness of 0.1 mm and a width of 100 mm made from Mirason No. 9 was immersed in a bath containing said solution and being kept at 60°C, and 5.2 percent by weight of said solution was laid on the surface with respect to the weight of polyethylene. Then, the film was heat-treated in a thermostat at 90°C for 120 minutes to make the solution permeate into the film. The permeation efficiency of the laid solution into the film was almost 100 percent.

EXAMPLE B

Two percent by weight of tert-buty peroxyisobutyrate was laid on the surface of polyethylene film having a thickness of 0.1 mm and width of 100 mm made from Mirason No. 9, and the film was placed in a sealed container and the container was sealed in a thermostat at 90°C and heated for 5 hours. After the heat treatment, part of the film was taken up and left in xylene at 80°C for 5 hours. Then, the gel fraction [weight of the film after the immersion/weight of the film before the immersion X 100 (%)] was determined. All the gel fractions, which will be hereinafter referred to, were determined by this procedure.

The gel fraction of this film was 40.0 percent.

Then, 4 percent by weight of di-α-cumyl peroxide dissolved in the same amount of heavy insulating oil as that of di-α-cumyl peroxide was uniformly laid on said film, and heated in a thermostat at 90°C for 2 hours, whereby di-α-cumyl peroxide and the heavy insulating oil were allowed to permeate into the film.

Example C

| Process oil for rubber | 2 parts by weight |
| Di-α-cumyl peroxide | 2 parts by weight |
| tert-Butyl peroxy-2-ethylhexanoate | 2 parts by weight |

Four percent by weight of said solution was laid on a film having a thickness of 0.2 mm and width of 100 mm made of ethylene-vinyl acetate copolymer, ACE 30 N (a trademark of Mitsui Polychemical K.K.) and allowed to permeate into the film in the same manner as in Example B, and heat-treated. The gel fraction of the film was 23 percent.

EXAMPLE D

Four percent by weight of the same solution as used in Example C was laid on a film having a thickness of 0.2 mm and width of 100 mm, made of ethylene-acrylic acid copolymer, DPDB 6169 (a trademark of UCC, U.S.A.) and allowed to permeate into the film in the same manner as in Example B, and heat-treated. The gel fraction of the film was 30 percent.

Example E

| synthetic insulating oil for OF cable (made by Nippon Sekiyu K.K.) | 2 parts by weight |
| Di-α-cumyl peroxide | 2 parts by weight |
| 1,1-bis (tert-butylperoxy)-3,3,5-trimethylcyclohexane | 2 parts by weight |

Five percent by weight of said solution was laid on a film having a thickness of 0.1 mm and width of 100 mm, made from Mirason No. 9, and heat-treated in a thermostat at 90°C for 5 hours to effect complete permeation of the solution into the film. The gel fraction of the film was 5.0 percent.

EXAMPLE 1

The film obtained in Example A was wrapped round a cable conductor on 40 layers at a half overlapping under a tension of 0.5 to 1.0 kg/mm$^2$ applied to the film. Then, a polytetrafluoroethylene tape and successively a polyester tape were wrapped round the film-wrapped article each on one layer, and further a band heater was wrapped round the outer layer. Heating was effected at 180°C for 4 hours to integrally weld the film interlayers and simultaneously effect cross-linking. The characteristics of the thus obtained cross-linked polyethylene insulation is given in Table 2. The characteristics in the Table are determined in the following manner:

Bonding strength: Wrapped portion was cut away at a thickness of 1.0 mm as a ring and subjected to 100 bendings at a direction perpendicular to the cross-section at plus and minus bending angles of 45° repeatedly, and the occurence of interlayer disengagement was visually observed.

Dielectric strength test: A test piece of 6.0 mm × 12.7 mm × 25.4 mm was cut away from the wrapped portion and a Tree initiation voltage was determined according to the single needle testing procedure as disclosed in AIEE Trans. Power Apparatus and System, Vol. 81, pages 112 – 121, June, 1962.

Deformation percentage: The wrapped portion was cut away as a ring, and thickness of wrapped layers were determined at several locations, and the deformation percentage was obtained from the maximum thickness and the minimum thickness according to the following formula:

$$\text{Deformation percentage} = \frac{\text{Minimum thickness}}{\text{Maximum thickness}} \times 100$$

TABLE 2

| | Characteristics | | | | |
|---|---|---|---|---|---|
| | Deformation, percent | Gel fraction, percent | Bonding strength | Tree initiation voltage (kv.) | Corona starting voltage (kv.) | |
| | | | | | Initiation | Extinction |
| Example 1 | 88 | 93.8 | No peeling. | 30.0 | 35 | 34 |
| Comparative Example 1. | 98 | 72.5 | Peeled | 11.0 | 26 | 25 |
| Comparative Example 2. | 90 | 94.6 | No peeling. | 27.5 | 30 | 29 |

In Comparative Example 1 in Table 2, a commercially available, electronic beam-irradiated polyethylene film having a thickness of 0.1 mm, Estron E (a trademark of Sekisui Kagaku K.K.) was used and in Comparative Example 2, such a film as prepared by laying 2.5 percent by weight of dissolved di-α-cumyl peroxide on a film used in Example A and allowing it to permeate into the film in the same manner as in Example A was used. The films were laminatedly wrapped round cable conductors in the same manner as in Example 1 respectively, and integrally welded by heating.

The Comparative Examples are given just for comparison.

EXAMPLE 2

The film obtained in Example B was wrapped directly round a cable insulator having a diameter of 30 mm for cross-linked polyethylene cable on 40 layers at a half overlapping under a tension of 0.5 to 1.0 kg/mm² applied to the film. Then, a polytetrafluoroethylene tape and successively a polyester tape were wrapped round the wrapped layers each on one layer, and further a band heater was wrapped round the outermost layer, and heating was effected at 180°C for 4 hours.

The characteristics of the thus obtained cross-linked polyethylene are given below:

| | |
|---|---|
| Deformation percentage: | 95.0 % |
| Gel fraction: | 93.3 % |
| Bonding strength: | no peeling |
| (boundary layer to cable insulator) | |
| Tree initiation voltage: | 27.0 KV |

EXAMPLES 3 AND 4

Cross-linked polyethylene insulations were obtained from the films obtained in Examples C and D in the same manner as in Example 1 respectively. The characteristics of these insulations are given in Table 3.

TABLE 3

| | Characteristics | | | |
|---|---|---|---|---|
| | Deformation, percent | Gel fraction, percent | Bonding strength | Tree initiation voltage (kv.) |
| Example 3 | 95.0 | 91.3 | No peeling | 13.2 |
| Example 4 | 90.0 | 87.2 | do | 15.0 |

EXAMPLE 5

The film obtained in Example A, commercially available election beam-irradiated polyethylene film, Estron E, and holding tape were wrapped round cable conductors in the manner as shown in Table 4, and heating was then effected from the outside by means of a band heater to weld the film wrapped layers and simultaneously effect cross-linking, whereby the cross-linked polyethylene insulations were obtained.

The characteristics of the thus obtained cross-linked polyethylene insulations are given in Table 5.

TABLE 4

| | | Composition | | |
|---|---|---|---|---|
| | Conductor | Wrapping manner and number of layers 32.5 mm.² (61/2.6 mm.) | Thickness of wrapped tape layers, mm. | Outer, diameter mm. |
| Semi-conductive layer | Semi-conductive clothtape | 1/2 overlap: 1 layer | 0.2 | 30.0 |
| | Semi-conductive polyethylene tape | 1/2 overlap: 3 layers | 0.5 | 30.4 |
| Insulating layer* | Film of Example A | 1/2 overlap: 36 layers | | 31.4 |
| | Estron E | 1/2 overlap: 9 layers | 6.0, 7.0 | 43.5, 44.5 |
| Outer semi-conductive layer | Semi-conductive polyethylene tape | 1/2 overlap: 1 layer | 0.2 | 43.8, 44.9 |
| | Tetrafluoroethylene tape | 1/2 overlap: 1 layer | | |
| Holding tape | Polyester tape | 1/2 overlap: 4 layers | | |
| | Iron sleeve band heater | Butt, 1 layer | | |

*The insulating layer was prepared by wrapping four layers of CL-P tape and one layer of Estron E over the CL-P tape layer and repeating said wrappings.

*: The insulating layer was prepared by wrapping four layers of CL-P tape and one layer of Estron E over the CL-P tape layer and repeating said wrappings.

TABLE 5

| | Characteristics | | | | | | | |
|---|---|---|---|---|---|---|---|---|
| | Deformation, percent | Gel fraction, percent | Bonding strength | Dielectric strength test (kv.) | Corona characteristics | | Tan δ, percent | AC long-term breakdown voltage (kv.) |
| | | | | | Initiation | Extinction | | |
| Example 5 | 98.0 | 90.00 | No peeling | 30.0 | 35 | 34 | 0.05 | 160 |
| Comparative Example 3 | 95.0 | 20.0 | do | 10.5 | 30 | 29 | 0.04 | 150 |

In Comparative Example 3 in Table 5, the film of Example A in the composition of Table 4 was replaced with a film made from Mirason No. 9, wherein no permeation of the insulating oil, di-α-cumyl peroxide, etc. was not effected. The polyethylene insulation was made by using such Mirason film and its characteristics are given in Table 5 for comparison.

EXAMPLE 6

A cross-linked polyethylene insulation having a wall thickness of 15.0 mm was obtained in the same manner as in Example 5 in the composition shown in Table 6.

TABLE 6

| Conductor | 725 mm² (91/32 mm) |
|---|---|
| Semi-conductive cloth tape | 1/2 overlap: 1 layer |
| Semi-conductive polyethylene tape | 1/2 overlap: 3 layers |
| Film of Example E | 1/2 overlap: 80 layers |
| Semi-conductive polyethylene tape | 1/2 overlap: 2 layers |

The characteristics of the thus obtained cross-linked polyethylene insulator are given below:

| Deformation percentage: | 99.6 % |
|---|---|
| Gel fraction: | 85.5 % |
| Bonding strength: | no peeling |
| Dielectric strength test: | 30.5 KV |

We claim:

1. A method for forming a cross-linked polyethylene insulation, which comprises immersing a solid phase polyethylene film having a thickness of 0.05 to 0.5 mm and containing 60 percent by weight of polyethylene soluble in xylene at 80°C. in a solution of substantially involatile hydrocarbon insulating oil containing at least 10 percent by weight of dissolved di-α-cumyl peroxide, impregnating the film with the solution until the film contains 0.5 to 5.0 percent by weight of the insulating oil and 0.5 to 5.0 percent by weight of the peroxide,; laminatedly wrapping the impregnated film around a solid article under a tension of 0.2 to 1.2 kg/mm² applied to the film to form a plurality of film interlayers; and then heating the wrapped article at a temperature of 110° to 180°C. to fuse said film interlayers into an integral insulating layer and to cross-link the polyethylene until at least 70 percent by weight of the polyethylene becomes insoluble in xylene at 80° C.

2. The method of claim 1 in which said solid article is an electrical conductor.

3. The method of claim 1 in which said involatile hydrocarbon insulating oil fills very fine voids formed between said layers.

4. A method for forming a cross-linked polyethylene insulation, which comprises immersing a solid phase polyethylene film having a thickness of 0.05 to 0.5 mm that is substantially completely soluble in xylene at 80°C. in a solution of substantially involatile hydrocarbon insulating oil containing at least 10 percent by weight of di-α-cumyl peroxide and at least 10 percent by weight of a peroxide for cross-linking polyethylene having a decomposition temperature lower than 110°C.; impregnating the film with said solution until the film contains 0.5 to 5.0 percent by weight of the insulating oil, 0.5 to 5.0 percent by weight of di-α-cumyl peroxide and 0.5 to 5.0 percent by weight of the peroxide having a decomposition temperature lower than 110°C.; heating the impregnated film at a temperature lower than 110°C. until 3 to 40 percent by weight of the polyethylene in said film becomes insoluble in xylene at 80°C.; laminatedly wrapping the resulting partially cross-linked film around a solid article under a tension of 0.2 to 1.2 kg/mm² applied to the film to form a plurality of film interlayers; and then heating the wrapped article at a temperature of 110° to 180°C. to weld the film interlayers into an integral insulating layer and to cross-link the polyethylene further until at least 70 percent by weight of the polyethylene becomes insoluble in xylene at 80°C.

5. The method of claim 4 in which the peroxide for cross-linking polyethylene having a decomposition temperature below 110°C is selected from the group consisting of tert-butyl peroxy-2-ethylhexanoate, tert-butyl peroxyisobutyrate, and 1,1-bis(tert-butylperoxy)-3,3,5-trimethylcyclohexane.

6. The method of claim 4, in which said solid article is an electrical conductor.

7. The method of claim 4, in which said involatile hydrocarbon insulating oil fills very fine voids formed between said layers.

* * * * *